April 25, 1967 E. L. SCHNOEBELEN 3,315,545
GEAR DRIVEN SCREWDRIVER
Filed Dec. 2, 1964
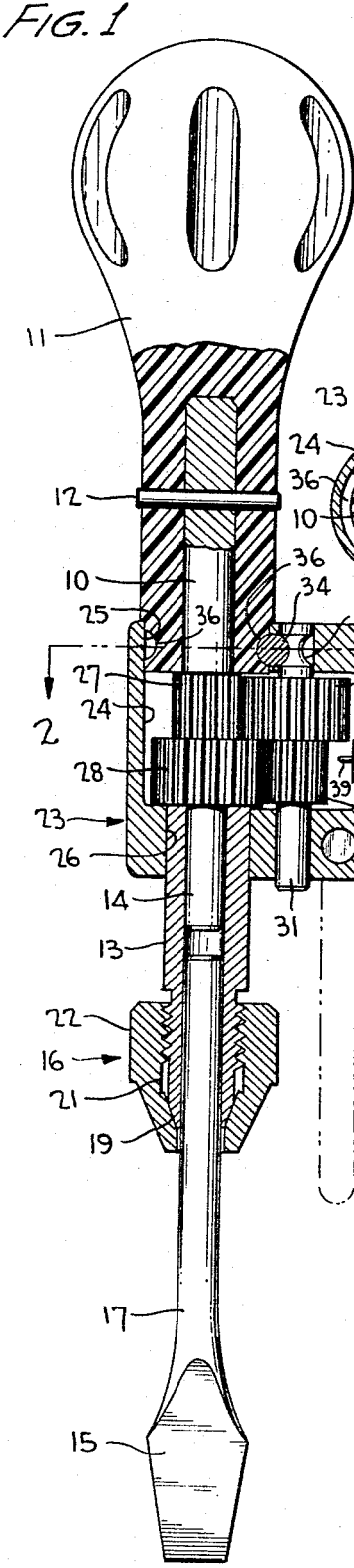
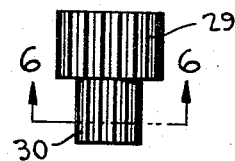
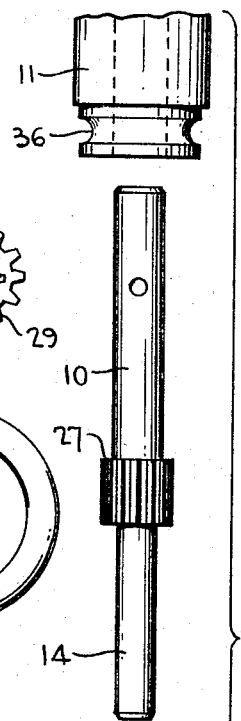
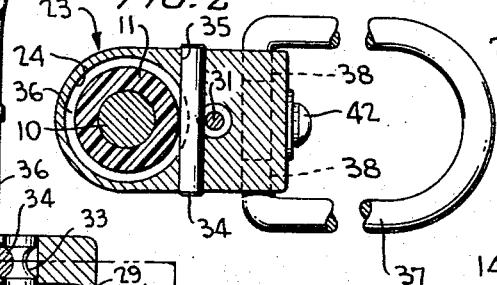
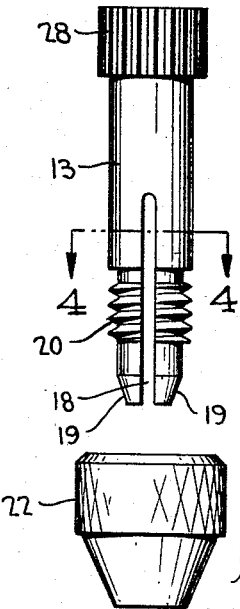
INVENTOR,
EARL L. SCHNOEBELEN
BY *Watson, Cole, Grindle & Watson,*
ATTORNEYS United States Patent Office 3,315,545
Patented Apr. 25, 1967

3,315,545
GEAR DRIVEN SCREWDRIVER
Earl L. Schnoebelen, P.O. Box 8471,
Allandale, Fla. 32023
Filed Dec. 2, 1964, Ser. No. 415,270
4 Claims. (Cl. 74—789)

This invention relates to an improved power transmission for providing a driving connection between relatively rotatable axially aligned members, for selectively establishing either a direct drive or a drive at relatively differing speeds between the input and output elements.

While mechanisms of the general class here involved have long been employed in connection with gear driven screw-drivers, bit drives, and the like where they find special utility, they have nonetheless been unduly complicated, bulky and expensive in construction, requiring the employment of each of the usual components of a planetary gearing, namely, a sun wheel, one or more planet wheels, a planet carrier and also an internal ring gear or orbit gear. Not only is such an internal gear required to be of an external diameter substantially greater than that of the orbit pursued by the planet gears, but in addition it inherently requires a housing of approximately greater dimensions, with the end result that the entire mechanism, in addition to its resulting expense and complexity, becomes so bulky as to obscure the operator's view of a tool or object which is driven by the output element of the mechanism.

With theses considerations in mind, the preliminary object of the instant invention is to provide a unique drive mechanism in which it is made possible to completely eliminate an internal gear, with its attendant expense and disadvantages as above pointed out, while permitting the use of a smaller casing or housing such as will not only avoid unduly obstructing the view of the work, but which in addition will permit utilization of devices employing the drive mechanism of the invention in crowded or inaccessible locations.

It is a further important object of the invention to provide a particularly novel and compact construction of the transmission unit per se which requires but two different sizes of gears, and a total of but four gears arranged in a compact manner within the housing. The housing may accordingly be of minimum dimension in a plane transverse to the rotational axis of the driving and driven elements.

It is a further important object to so arrange the mechanism and its supporting housing that the housing need project radially beyond the input and output elements to but a minimum extent around the greater portion of the circumference thereof. This is made possible by positioning the driving and driven gears for rotation about the common axis of the driving and driven elements, while disposing the intermediate gears also for rotation in axial alignment.

It is a still further important feature of the invention to provide a novel, selectively operable means for immobilizing the transmission gearing to establish a direct driving connection through the immobilized gearing to the respective driving and driven elements.

It is a still further object to provide, in conjunction with such gearing, lever means swingable from an operative position in which it projects radially from the gear housing for manual engagement or for abutment against a fixed structure to maintain the gear housing stationary while the gearing is employed to transmit rotary movement from an input element to an output element at either a reduced or increased rotational speed, depending upon the relative diameters of the intermeshing gears and their positions in the drive train.

A still further object is to so arrange the several parts as to facilitate their assembly and disassembly in novel, simplified manner.

In the accompanying drawings, there is illustrated a gear driven screwdriver embodying the features of my invention and illustrating the preferred embodiment of the invention. This will be described in some detail in the following description, which will designate certain parts by specific terminology. However, it is to be recognized that the foregoing drawings and description are merely by way of exemplification of the invention, and it is not my intention to limit the scope of the invention either by the specific embodiment and use chosen herein to illustrate the invention, or by the particular terms which may be employed primarily to facilitate a rapid understanding of the invention.

In the accompanying drawings:

FIGURE 1 represents an axial section through a gear driven screwdriver which employs the invention.

FIGURE 2 is a section on the line 2—2 of FIGURE 1.

FIGURE 3 is an exploded view of the input and output elements, and of the gears affixed to each, together with a portion of the manual operating handle of the input element.

FIGURE 4 is a section on the line 4—4 of FIGURE 3.

FIGURE 5 is a side elevation of the transmission gears; and

FIGURE 6 is a section on the line 6—6 of FIGURE 5.

Referring now in detail to the accompanying drawings, the driving element of the gear driven screwdriver here shown is designated by the numeral 10. The driving element in this embodiment includes a conventional operating handle 11, which though adapted for manual actuation, exemplifies any means for rotating the driving element 10 about its longitudinal axis. It will be seen that the driving element 10 per se is snugly received within the socketed lower end of the handle 11 and fixedly secured therein against rotation by means of the cross pin 12.

The output element or driven element 13 is here illustrated in the form of a tubular metal sleeve.

For rotatably interconnecting the input and output elements 10 and 13 for relative rotary movement about a common axis, a suitable means is provided by the upper end portion of the tubular sleeve 13 and receives and provides a journal for the downward extension or projection 14 of the driving element.

It is to be understood that the torque transmitted through the output element 13 may be employed to drive any suitable tool, implement or other rotary device, as exemplified by the screwdriver blade 15. To this end, the output element 13 is provided at its lower end with a generally conventional chuck, designated 16 in its entirety, for interchangeable gripping reception of the shank 17 of the screwdriver 15 or other driven tool or device.

The illustrated chuck 16 is of generally conventional construction, being formed by downwardly tapering and slotting the tubular output element 13 upwardly from its lower end, as at 18 in FIGURE 3, to form a pair of radially contractable complementary gripping chuck jaws 19—19. These jaws are externally threaded as at 20 for cooperation with the threads of a similarly tapered and internally threaded bore 21 of a nut 22, whereby the wedging action of the nut incident to its threading onto the jaws 19 may tighten the latter against the shank of a tool inserted into the lower end of sleeve 13.

A transmission housing 23 is supported for rotation in any suitable manner about the common axis of relative rotation of the input and output elements 10 and 13 (hereinafter also referred to sometimes as the driving and driven elements), in such manner that it may be free for relative rotation with respect to both elements 10 and 13 when the latter are interconnected through the gearing of the invention for rotation at different speeds.

The gear box 23 thus defines an interior compartment 24 for housing of the various gears hereinafter described, and is formed with axially aligned circular bores 25 and 26 respectively opening into one side of said compartment through the upper and lower ends of the housing 23. The driven or output element 13 is rotatably journaled through the bore 26, while the input member 10 is rotatably projected into the housing through the bore 25 with its lower end or extension 14 rotatably received in telescoping manner in the upwardly-opening end portion of the output element 13. A drive gear 27 is rigidly affixed to the input element 10, while the output member 13 has affixed to its upper end within the housing 23 a driven gear 28.

Gears 27 and 28 are normally free for rotation with respect to each other, and are interconnected by relatively axially aligned gears 29 and 30 supported within the interior of gear housing 23 by countershaft 31 for rotation together about a common axis parallel to that of the input and output elements 10 and 13, and spaced to one side thereof.

These gears 29 and 30 are interconnected for rotation together, and to this end may if desired be formed as an integral unit.

In the present embodiment, the gearing is intended for use as reduction gearing to permit the selective application of an increased driving torque to screws during the final stages of the screw driving function. To this end, the drive gear 27 is of smaller diameter than the gear 29 with which is intermeshes, while the gear 30 which rotates with gear 29 is in turn of smaller diameter than the driven gear 28 with which it meshes. By virtue of the relationship here shown, it will be readily apparent that the larger gears 28 and 29 may be of similar diameter, as may the smaller gears 27 and 30, thereby requiring but two different diameters of gears in the entire unit. These may be formed as individual gears to facilitate their interchangeability.

In the particular embodiment here illustrated, the gear box 23 serves not only as a housing for the several gears, but in addition serves further important functions, one of which, it will be obvious, is to provide a further means of rotatably interconnecting the driving and driven elements 10 and 13.

Moreover, this gear box 23 is formed to facilitate the assemblage of the several parts. Thus, it should be noted that the bore 25 is of a size to permit assembly of the parts by insertion therethrough of the interconnected gears 29 and 30 and their subsequent lateral shifting to operative position at one side of the gear compartment 24 as shown, and the subsequent insertion of the input and output elements 11 and 13 and their gears 27 and 28. The adjoining rounded inner surface 32 of the housing normally will coact with the gear 29 to center the same for operative reception of the countershaft 31. Countershaft 31 is shown as provided adjacent one end with an annular groove 33 for reception of a locking pin 34 which is snugly fitted through an appropriately located cross bore 35 in the housing. The bore 26, in which the output sleeve element 13 is rotatably journaled, is of somewhat smaller diameter than both the bore 25 and driven gear 28, but of suitable size to axially receive and function as a bearing or journal for the output element 13. The annular driven gear 28 affixed to the output element 13 is of larger diameter than the bore 26 so as to abut axially against the housing 23 around bore 26 and thus to limit the axial downward movement of the output sleeve element 13.

The same locking pin 34 which secures the countershaft 31 against axial displacement, preferably extends between the countershaft 31 and the input member 10 for locking reception in an annular groove 36 around the lower end portion of the handle 11. This portion is journaled within and closes the opening 25 of the housing 23.

It will be seen by reference to the plan view of FIGURE 2 that, because of the arrangement of the gears 27 to 30, and the elimination of any large diameter internal gears, the configuration of the gear housing may be such that the periphery of the housing around most of its perimeter is at a minimum radial distance from the common rotational axis of the driving and driven elements 10 and 13. This will permit an unobstructed view of the work and will avoid interference by adjacent objects with rotary movement of the gear box.

Where the drive to the screwdriver blade 15 is desired to be transmitted through the reduction gearing, it will of course be necessary that the gear housing 23 be restrained against rotation with the input element 10. For this purpose there is provided a handle 37 which, as shown in FIGURE 2, is of substantially U shape, with its legs bent inwardly at their free ends to define pivots 38 which are rotatably received in openings in opposite sides of the housing 23. Normally, the operating handle 37 will tend to swing downwardly by gravity to a depending position in which it will present minimum interference to operation of the device, while being readily accessible for upward swinging to the operative position indicated in FIGURE 2, in which it may be grasped and held to apply rotation-resisting force with a distinct mechanical advantage to the housing 23.

For immobilizing the gears to arrest the rotation thereof, in order to impart direct drive between the driving and driven, or input and output elements, there is provided a novel means, substantially in the form of an axially slidable gear latch 39, and comprising a stud having the shape of a single gear tooth, for axial sliding in and from a position in interlocking relation between adjoining teeth of the gear 29. The latch 39 is carried at the inner end of a shank 40 which in turn is slidably disposed and guided through an axial slot 41 in the gear housing 23. The position of the latch 39 is readily controllable through a button 42 carried at the external end of the shank 41 for actuation by finger pressure. The latch 39 terminates short of the path of rotation of the teeth of gear 30, to avoid interference with its rotation when positioned axially abreast of gear 30.

In the operation of the invention which is believed to be readily apparent from the foregoing, whenever the device is to be used to transmit rotation by direct drive, as for instance during the initial stages of the driving of a screw, the reduction gearing may be immobilized by actuation of the gear latch 39, whereupon the gear housing and its contents, together with the input and output elements 10 and 13, will all rotate together about the common axis of elements 10 and 13. However, as the need for applying a greater torque arises, as for instance where the screw approaches its seated position, the latch 39 is released, while the handle or lever 37 is erected to the position shown in FIGURE 2, and employed in the manner of a lever to restrain the casing against rotation while the driving or input element 10 is rotated by means of its handle 11. Its rotation is transmitted at a mechanical advantage, in this instance, through the gears 27, 29, 30 and 28 respectively, to the output member 13, and the screwdriver 15, which in the present instance comprises a portion of the output member.

In this application there is shown and described only the preferred embodiment of the invention simply by way of illustration of the preferred mode of carrying out the invention. However, I recognize that the invention is capable of other different embodiments and that its several details may be modified in various obvious ways, all within the scope of the invention. It is accordingly not my intention to restrict the scope of the invention in any manner, except as may be specifically required by the appended claims.

Having thus described my invention, I claim:

1. A gear-driving mechanism comprising a driving element, a driven element, means interconnecting said driving and driven elements for relative rotary movement about a common axis, a driving gear fixed coaxially to the driving element for rotary movement therewith, a driven gear fixed coaxially to the driven element for rotary movement therewith, a transmission housing rotatably carried by said mechanism for normally free rotation about said common axis with respect to both of said elements, transmission gearing disposed in said housing for rotation about a second axis spaced from and parallel to said common axis, said transmission gearing comprising a pair of axially aligned gear members interconnected for rotation together about said second axis, and respectively intermeshing with said driving and driven gears, a gear latch carried by said housing and selectively operable to immobilize said transmission gearing whereby to establish a direct driving connection between said driving and driven members, said transmission gear members being of relatively different diameters, said gear latch comprising a stud guided within the housing for axial movement and projecting radially inwardly of the housing toward said second axis for axial movement into and from interlocking relation between adjoining gear teeth of the larger diameter transmission gear member, said latch terminating short of the path of rotation of said teeth of the smaller diameter gear member, whereby to permit rotation of said gears when positioned axially abreast of said smaller diameter gear member.

2. A mechanism as defined in claim 1 in which said gear latch is guided for axial movement through a slot in said casing parallel to said second axis, said latch including an actuating button externally of the casing to permit the manual positioning of the gear latch.

3. A power transmission unit comprising a housing formed with aligned first and second bores opening into its hollow interior, relatively axially aligned driving and driven elements rotatably journaled in the respective bores for relative rotary movement about a common axis, a driving gear affixed to said driving element within said housing and a driven gear affixed to said driven element within said housing, a countershaft extending across the interior of said housing parallel to said common axis and spaced therefrom, and a pair of axially aligned transmission gears supported on said countershaft in meshing relation with the respective driving and driven gears, said transmission gears being interconnected for rotation together, said countershaft being removably disposed through relatively aligned bores in said housing spaced from said common axis for axial reception of said countershaft, all of said gears being of smaller diameter than said first bore in the housing, said first bore being of substantially larger diameter than said second bore, whereby in assembling said unit, said interconnected transmission gears may be first inserted into the housing through said first bore and displaced laterally to a position in axial alignment with said relatively aligned bores for reception of said countershaft, the interior of said housing being shaped to substantially center said transmission gears with respect to the countershaft for ready reception of the latter, one of said elements with its associated gear being rotatably journaled through said second bore, the gear of said one element being of larger diameter than said second bore whereby to rotatably abut against said housing in one axial direction, the other said element with its associated gear being insertable through said opening to operatively position its said gear, said one element rotatably and axially abutting said other element in a second axial direction, said other element including a radially enlarged bearing portion for rotary reception in the said one bore.

4. A power transmission unit comprising a housing formed with aligned first and second bores opening into its hollow interior, relatively axially aligned driving and driven elements rotatably journaled in the respective bores for relative rotary movement about a common axis, a driving gear affixed to said driving element within said housing and a driven gear affixed to said driven element within said housing, a countershaft extending across the interior of said housing parallel to said common axis and spaced therefrom, and a pair of axially aligned transmission gears supported on said countershaft in meshing relation with the respective driving and driven gears, said transmission gears being interconnected for rotation together, said countershaft being removably disposed through relatively aligned bores in said housing spaced from said common axis for axial reception of said countershaft, all of said gears being of smaller diameter than said first bore in the housing, said first bore being of substantially larger diameter than said second bore, whereby in assembling said unit, said interconnected transmission gears may be first inserted into the housing through said first bore and displaced laterally to a position in axial alignment with said relatively aligned bores for reception of said countershaft, the interior of said housing being shaped to substantially center the said transmission gears with respect to the countershaft for ready reception of the latter, one of said elements with its associated gear being rotatably journaled through said second bore, the gear of said one element being of larger diameter than said second bore whereby to rotatably abut against said housing in one axial direction, the other said element with its associated gear being insertable through said opening to operatively position its said gear, said one element rotatably and axially abutting said other element in a second axial direction, said other element including a radially enlarged bearing portion for rotary reception in the said one bore, said countershaft and said bearing portion both being encircled by annular grooves in a common plane, said casing having a cross bore extending transversely between said bearing portion and said countershaft in said plane, and a locking pin removably supported in said bore for reception in both said grooves, whereby to simultaneously interlock said bearing portion and said countershaft against axial displacement.

References Cited by the Examiner

UNITED STATES PATENTS

| | | | |
|---|---|---|---|
| 348,765 | 9/1886 | Neal | 145—68 |
| 577,656 | 2/1897 | Hendrickson | 74—421 |
| 1,148,365 | 7/1915 | Duval | 145—68 |
| 1,212,481 | 1/1917 | Hall | 145—68 |
| 1,280,535 | 10/1918 | Perko | 74—710.5 |
| 1,395,876 | 11/1921 | Tiencken | 145—68 |
| 1,991,766 | 2/1935 | Matveyeff | 145—68 |
| 2,335,926 | 12/1943 | Fawick | 74—606 |
| 2,477,528 | 7/1949 | Shrader | 74—789 |
| 2,558,897 | 7/1951 | Akins | 74—802 |
| 3,135,135 | 6/1964 | Dalton | 74—802 |

DONLEY J. STOCKING, *Primary Examiner.*

THOMAS C. PERRY, *Examiner.*